Figure 3:
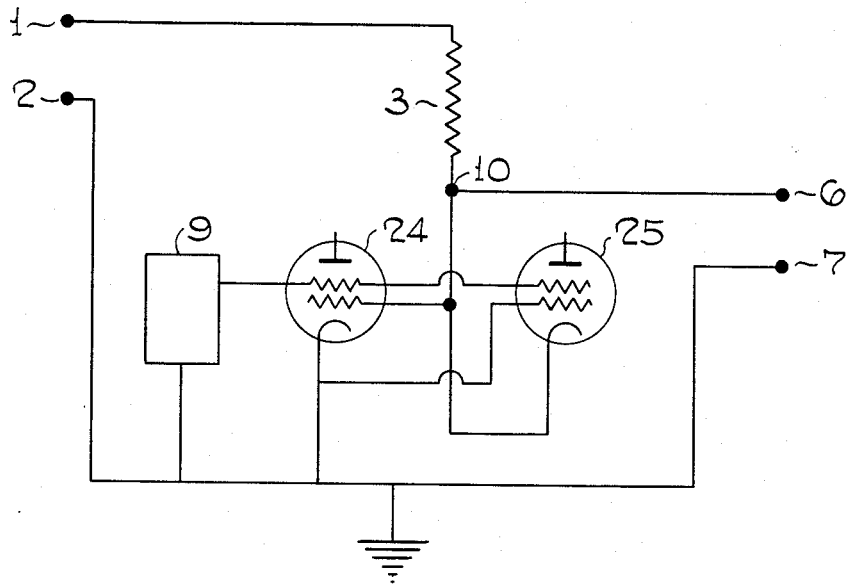

Dec. 6, 1955      E. H. MEIER      2,726,290
SURGELESS ELECTRONIC VARIABLE RESISTOR AND ATTENUATOR
Filed June 11, 1949      2 Sheets-Sheet 1
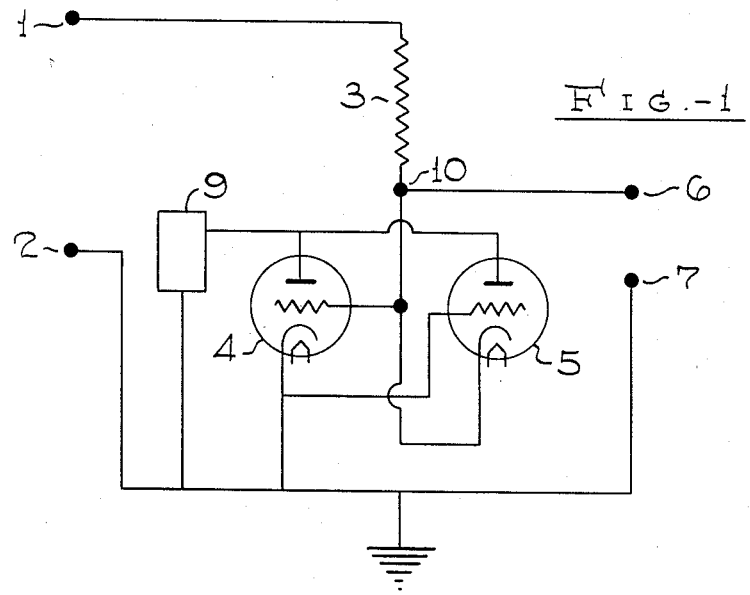
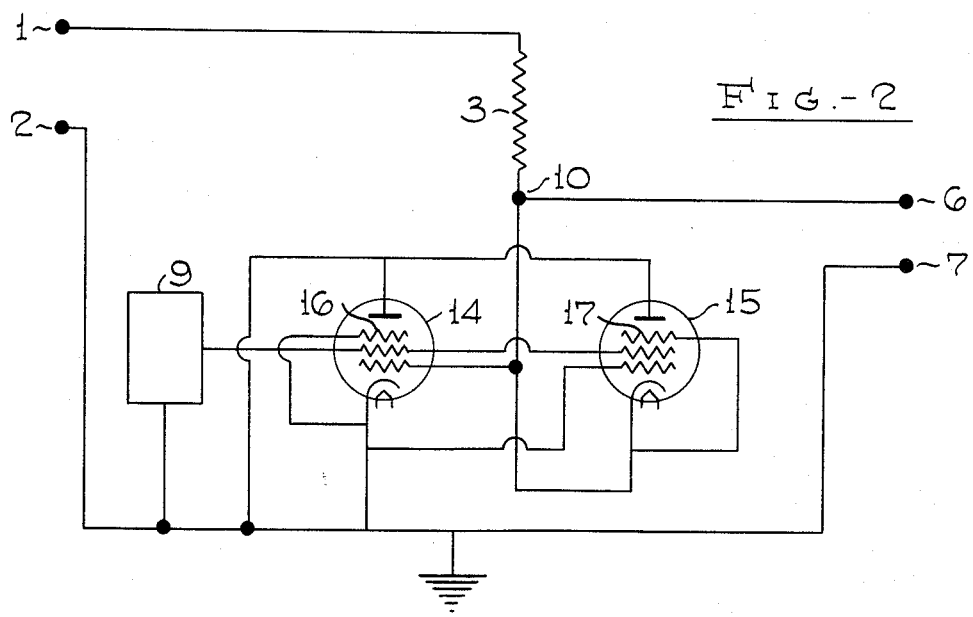
Edwin H. Meier Inventor
By W. O. T. Hulman Attorney

United States Patent Office 2,726,290
Patented Dec. 6, 1955

2,726,290

SURGELESS ELECTRONIC VARIABLE RESISTOR AND ATTENUATOR

Edwin H. Meier, Tulsa, Okla., assignor to Esso Research and Engineering Company, a corporation of Delaware Application June 11, 1949, Serial No. 98,506

8 Claims. (Cl. 179—171)

The present invention relates to a novel electronic circuit and to the use of such a circuit as a variable linear resistance. More particularly it relates to a novel arrangement for providing a surgeless variable attenuator for A. C. voltages.

In many applications of electronic circuits it is necessary to attenuate a signal in order that said signal can be used properly. This is particularly true in amplifier circuits which are to be used in conjunction with seismograph equipment for the recording of sound waves picked up by geophones during seismic prospecting.

One well-known technique of exploration for oil or other mineral deposits comprises seismic prospecting or reflection seismography wherein a hole is drilled into the earth and an explosive shot or other means of producing sound is placed in the hole. The sound source is actuated and the sound waves traveling through the earth are detected at various points on the surface of the earth by means of sensitive pick-ups or geophones which translate the detected sound waves into electrical impulses which after suitable amplification can be recorded on a seismograph. Conventionally, a seismograph record is obtained by means of a number of moving coil galvanometers each one of which has a mirror attached thereto, the galvanometers being arranged in a battery in connection with a source of light in such relation to a moving strip of sensitized paper or film that there will be recorded on the paper or film a plurality of wave forms or traces representative of the sound waves which have been picked up by the individual geophones, suitably amplified, and fed to the galvanometers. Many seismograph instruments are capable of recording as many as 24 individual traces simultaneously. The strip of paper or film is moved longitudinally at a substantially constant speed and is provided with suitable timing marks so that when the seismograph record or seismogram is later examined it is possible to determine the length of time required for the arrival of sound waves at any particular point on the earth's surface either directly from the sound source or by reflection from underlying strata.

Since the wave energy force received by the geophones varies considerably in magnitude the amplification between each geophone and corresponding galvanometer must be continuously varied to cause the trace to be of usable size on the record paper. The desired variation in amplification may be obtained by sampling the output from an amplifier into which the signal is fed, amplifying the sampled output and using the amplified voltage to adjust the grid bias in the various amplifier stages and thereby automatically change the gain. This change in gain is accompanied by a change in the D. C. operating level in the various stages of the amplifier, which has the disadvantage of introducing surge voltages into the signal channel. These surges produce additional waves on the recorded traces and thus tend to confuse the seismograph record.

It has been found more desirable to obtain the desired variation in amplification by providing fixed amplification in combination with variable attenuation. Such variable attenuation may be conveniently effected by feeding the signal through a voltage divider consisting of a fixed resistor and a variable electronic resistor as the two arms.

One object of the present invention is to provide a novel variable electronic resistor. It is a further object of the present invention to provide an electronic variable attenuator giving a wide range of attenuation and having substantially no tendency to produce appreciable surges when the attenuation is changed. Other objects of the invention will be apparent from the ensuing description and from the accompanying drawings in which Fig. 1 presents a schematic diagram of one form of attenuator circuit in which the variable electronic resistor of this invention may be used, and in which Figs. 2 and 3 present schematic diagrams of alternate forms of circuit that may be employed. A block diagram showing the use of the attenuator circuit in a seismograph amplifier circuit is given in Fig. 4.

Briefly the invention comprises a novel form of electronic circuit which provides a variable linear resistance, i. e., a resistance through which the amount of current flowing is directly proportional to the potential applied across the resistance. In this electronic circuit the grid-cathode circuits of two vacuum tubes of the same design are cross-connected so that a circulating current of electrons can be established, flowing from the cathode of one tube to a grid of the same tube thence to the cathode of the second tube, from the cathode of the second tube to a grid of the second tube and then back to the cathode of the first tube.

With particular reference to Fig. 1, an A. C. input signal such as one received from a geophone is applied across terminals 1 and 2. Terminal 2 is connected to the common ground of the circuit and terminal 1 is connected to one end of resistor 3. The other end of resistor 3 is connected to a vacuum tube circuit which constitutes the variable electronic resistor of this invention and which comprises two vacuum tubes having a cross-connection of cathodes and grids, the two terminals of the variable resistor being the cathodes of the two tubes. Specifically, resistor 3 is connected through contact point 10 to the grid of vacuum tube 4 and to the cathode of vacuum tube 5. The cathode of tube 4 is connected to the grid of vacuum tube 5 and to the common ground. The plates of both vacuum tube 4 and vacuum tube 5 are connected to a source of potential 9, capable of producing a variable negative D. C. potential with respect to the common ground of the circuit. The resistor 3 forms one arm of the voltage divider and the cross-connected grid-cathode circuit of vacuum tubes 4 and 5 forms the other arm with the output of the attenuator circuit obtained at terminals 6 and 7, the latter terminal being connected to the common ground.

Source of variable negative D. C. potential 9 may be one that will provide a predetermined variation of potential with respect to time or it may be one that is adapted to be changed automatically in accordance with the strength of the output signal of an amplifier circuit. The former type of potential variation can be provided through the exponential build-up of the voltage in a condenser and the latter type by automatically applying a negative voltage which is a function of the output signal.

It can be seen from the circuit diagram of Fig. 1 that with the two vacuum tubes hooked together with a cross-connection of cathodes and grids a circulating electron current is set up, flowing from the cathode of tube 4 to the grid of tube 4 then to the cathode of tube 5 onto the grid of tube 5 and back to the cathode of tube 4. The magnitude of this circulating current varies with the potential applied to the plates of the vacuum tubes through the source of variable control potential 9, causing the resistance presented by the vacuum tubes, and hence the attenuation, to vary. As the potential applied to the plates is made more negative the magnitude of the circulating current through the cross-connected grid-cathode circuit decreases. As this current decreases the A. C. resistance between point 10 and the ground of the circuit increases. Conversely, if a high negative potential is applied to the plates initially and then decreased the resistance can be made to decrease. As the resistance in the electronic circuit increases the attenuation in the voltage divider decreases.

In Fig. 2 is presented a similar circuit in which pentode tubes are used instead of triode tubes. The input signal is applied across terminals 1 and 2. Terminal 2 is connected to the common ground and terminal 1 is connected to the fixed resistor 3, the other end of which is connected through contact point 10 to a vacuum tube circuit comprising tubes 14 and 15. Specifically, fixed resistor 3 is connected to the control grid of vacuum tube 14 and to the cathode of vacuum tube 15. The cathode of vacuum tube 14 is connected to the control grid of vacuum tube 15 and also to the common ground. The plates of vacuum tubes 14 and 15 are connected to each other and to the common ground. The suppressor grid of each vacuum tube is connected to the cathode of the same tube, and the screen grids of the two tubes are connected to each other and also to a source of variable negative control potential 9. The output from the variable attenuator circuit is obtained at terminals 6 and 7.

A circuit employing tetrodes instead of pentodes would be exactly as depicted in Fig. 2 except that suppressor grids 16 and 17 would be omitted.

In a similar manner as is obtained in the circuit of Fig. 1 a circulating electron current is set up between the control grids and the cathodes of the two vacuum tubes 14 and 15. The magnitude of this circulating current decreases as the potential of the screen grids with respect to the common ground of the circuit is made negative, and approaches zero as the screen grid potential reaches 80 volts or more negative. As this circulating current decreases the A. C. resistance across point 10 to ground increases and hence, the attenuation decreases. Specifically, with a type 9001 tube the A. C. resistance will vary between a minimum of approximately 500 ohms and the maximum resistance, which approaches that of an open circuit. This A. C. resistance together with fixed resistance 3 make up the voltage divider which produces a wide range of attenuation between the input voltage and the output voltage. The amount of attenuation obtained will depend upon the control voltage applied to the screen grids through the source of variable potential 9. A circulating electron current exists between the two tubes 14 and 15, as previously described and any change in the control voltage introduced at the screen grids by means of variable potential source 9 will not introduce appreciable surges in the output since the current flowing from the cathode to the control grid in each of the vacuum tubes is changed by an equal amount whenever the control voltage is changed. Another advantage of this invention is that essentially no current is required from the potential source 9 to supply the control voltage, since the electrode to which the control voltage is applied (the plate in the circuit of Fig. 1 and the screen grid in the circuit of Fig. 2) is at a substantial negative potential with respect to that of the cathode.

It is also possible to employ in this invention vacuum tubes of special design, as for example tubes each of which has only a cathode and two or more grids, or to employ only the cathodes and two grids of standard design vacuum tubes, since the essential feature of the cross-connection arrangement is that the pair of vacuum tubes have at least three electrodes, the cathode of each tube being connected to the electrode nearest the cathode in the other tube, at least one of the remaining electrodes of each tube being connected to a corresponding electrode of the other tube, the cathodes of the two tubes constituting the two terminals of the electronic resistor. Thus for example, as shown in Fig. 3, two tetrode tubes 24 and 25 are employed in which the cathode of tube 24 is connected to the control grid of tube 25 and to the common ground and the cathode of tube 25 is connected to the control grid of tube 24 and to resistor 3. The remaining grid in tube 24 is connected to the corresponding grid in tube 25 and to potential source 9. The plates in each tube are not used in this particular circuit.

Figure 4:
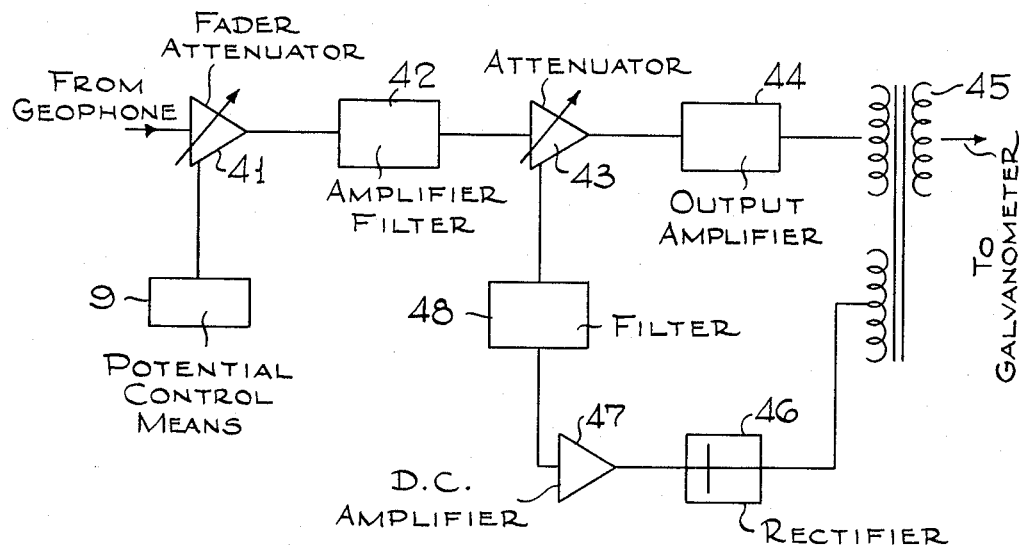

One method of applying the attenuator of the present invention to an amplifier circuit used in a seismograph is illustrated by Fig. 4, showing a block diagram of the elements comprising the amplifier circuit. The electrical signal from the geophone enters attenuator 41 which is of the design illustrated by Fig. 1 or Fig. 2, the latter design being preferred. The attenuated signal passes through an amplifier and filter network 42 and the amplified and filtered signal is fed into a second attenuator 43 of the same or similar design as attenuator 41. The amplifier and filter network referred to may be of any suitable design, its function being to amplify the signal to a level suitable for recording on a seismograph and for filtering out spurious signals which do not contribute to interpretation of the record. A suitable amplifier filter network will be one providing for amplification factors of say 100 to 3000 and which is adapted to filter out signals whose frequencies fall outside the range it is desired to record. Thus "ground roll," having frequencies below about 15 cycles per second, and wind noise, having frequencies of 100 cycles per second or higher, would be filtered out. The amount of attenuation effected by attenuator 41 which is referred to as the fader attenuator, is preferably predetermined and is controlled by the amount of voltage applied to the plates of vacuum tubes 4 and 5 in the attenuator illustrated by Fig. 1 or to the screen grids of vacuum tubes 14 and 15 of the attenuator of Fig. 2.

Attenuator 41 is called a fader attenuator since the predetermined negative control voltage, which is applied through control means 9, is set to increase with time, and hence the attenuation decreases with time. As was pointed out above, when the negative potential applied to the vacuum tube circuit is made to increase the resistance across the circuit will increase. Thus in the complete attenuator circuit including resistor 3 the attenuation will decrease with an increase in the negative control voltage. By providing for a predetermined build up in negative potential with time the attenuator can be made to "fade" to compensate for decreasing incoming signal level with time.

The control voltage variation applied to fader attenuator 41 through potential control means 9 is predetermined before a particular seismograph record is to be taken and is easily determined by the seismograph operator from the type of records obtained from previous seismic shots made in the same area. Voltage variation in control means 9 can be effected by any means known to the art and usually provides for a selection of initial voltage and final voltage and a time constant for change from initial voltage to final voltage. The voltage variation may be initiated through suitable relays actuated by any desired means, as for example by an impulse received from a geophone placed near the point at which the shot is to be fired or at which other means of initiating a sound wave is placed.

Control means 9 may suitably comprise a resistance-capacitance exponential circuit in which the time required for building up from initial to final voltage is determined by a proper selection of condensers and resistors. Such circuits are well known to persons skilled in the art and need not be described here.

Referring again to Fig. 4 it will be seen that the filtered and attenuated signal leaving attenuator 43 is fed to an output amplifier 44, then through an output transformer 45 to the galvanometer. By means of a third winding on transformer 45 part of the output signal is sampled and fed back to attenuator 43 through rectifier 46, D. C. amplifier 47 and filter 48, thus providing an automatic volume control voltage for attenuator 43. Filter 48 is preferably a low pass filter i. e., one that will hold back the high frequency components of the rectified current in order to provide the proper time response characteristics in the automatic volume control circuit. Filter 48 is connected to attenuator circuit 43 in the same manner as variable potential source 9 is connected to attenuator 41. However, whereas control means 9 applies a control voltage that varies with time in a predetermined manner, the control voltage applied by filter 48 is a function of the signal level in amplifier 44.

From the foregoing description it will be seen that this invention broadly provides a linear variable resistance comprising an electronic circuit consisting of a pair of vacuum tubes each having at least three electrodes, the tubes being employed in a cross-connection arrangement, i. e., the cathode of each tube is connected to the electrode nearest the cathode in the other tube. In addition at least one of the remaining electrodes of each tube is connected to a corresponding electrode in the other tube.

Control voltage for the circuit is applied to the electrode in the tube nearest to the electrode involved in the cathode cross-connection arrangement. Thus, when using triode tubes, control voltage will be applied to the plates of the tubes, and when using pentode tubes the control voltage will be applied to the screen grids. The electrodes to which the control voltage is applied are always connected to each other.

With this cross-connection arrangement of the two tubes a circulating current can be set up between the two tubes in such a manner that any change in the control voltage will cause the resulting impedance to change correspondingly without introducing surges into the circuit.

A principal use for the novel variable linear resistance of the present invention is as the variable electronic resistor in an attenuator circuit comprising the said variable resistor and a fixed resistor. When so employed the fixed resistor is tied into the electronic tube circuit through the cathode of one of the tubes.

One of the advantages of the attenuator circuit of the present invention over prior circuits is that variable attenuation can be obtained with no appreciable surge being produced when the control voltage is varied. Another important advantage is that substantially no current flow is necessary from the source of variable potential to supply the control voltage. This is of particular importance in an attenuator used in an automatic volume control arrangement since it enables closer control than has heretofore been possible.

It is to be understood that although the attenuator of this invention has been particularly described for use in amplifier circuits for seismic exploration it may also be employed in any circuit in which it is desired to attenuate an alternating current.

It is not intended that the invention be limited by the particular illustrations given and it is apparent that numerous modifications can be made by persons skilled in this particular art without departing from the spirit of the invention as defined in the following claims.

What is claimed is:

1. A circuit for filtering and amplifying seismic signals comprising a first attenuator circuit, an amplifier and filter network connected to the output of said first attenuator circuit, and a second attenuator circuit connected to the output of said amplifier and filter network, said first and second attenuator circuits each comprising a voltage divider consisting of a fixed resistor and an electronic circuit, said electronic circuit comprising a pair of vacuum tubes whose plates are connected to each other, a grid of the first of said vacuum tubes being connected to the cathode of the second of said vacuum tubes and to said fixed resistor and the cathode of the first of said vacuum tubes being connected to a grid of the second of said vacuum tubes, said electronic circuit in each of said attenuator circuits being provided with means for varying, with respect to the potential on the cathode of each tube, the potential on an electrode other than the cathode and other than the electrode connected to a cathode, the input terminals of each attenuator comprising the free end of its fixed resistor and one of its cathodes and the output terminals of each attenuator comprising both of its cathodes.

2. Circuit for seismic signals according to claim 1 in which the means for varying the electrode potential in the electronic circuit of the second of said attenuator circuits comprises an automatic volume control circuit adapted to sample a portion of the output signal received from said second attenuator circuit, rectify, amplify and filter said sample signal and apply to said electronic circuit of said second attenuator circuit a negative electrode potential which is a function of the signal level of said output signal.

3. A linear variable resistor comprising an electronic circuit consisting of a pair of vacuum tubes each of which has at least three electrodes, the cathodes of the vacuum tubes being cross-connected to the other electrodes in the tubes in such a manner that the cathode of each tube is connected to the electrode nearest the cathode of the other tube, and of the remaining electrodes at least the electrode nearest the electrode involved in the aforesaid cross-connection is connected to the corresponding electrode in the other tube, and means for impressing a variable regulating potential on said last named connected electrodes with respect to one of said cathodes, said two cathodes comprising the two terminals of said resistor.

4. An adjustable impedance element comprising first and second electron discharge devices each having an electron emissive cathode, a grid electrode adjacent said cathode, and a second electrode relatively more remote than said grid from said cathode; means electrically connecting the grid electrode of the first to the cathode of the second of said devices and forming a first terminal of said impedance element; means electrically connecting the grid electrode of the second to the cathode of the first of said devices and forming a second terminal of said impedance element; and means electrically connected to said second electrodes of both said devices in common and to a selected one of said cathodes for adjustably biasing the former negative with respect to the latter.

5. A circuit for amplifying seismic signals comprising an attenuator circuit having input terminals and output terminals, said attenuator circuit comprising a fixed resistor in series with an electronic circuit to form a voltage divider, said electronic circuit comprising a pair of vacuum tubes whose plates are connected to each other, a grid of the first of said vacuum tubes being connected to the cathode of the second of said vacuum tubes and to said fixed resistor and the cathode of the first of said vacuum tubes being connected to a grid of the second of said vacuum tubes, the input terminals of the attenuator comprising the free end of the fixed resistor and the free cathode-to-grid connection, the output terminals of the attenuator comprising the cathodes of the tubes of said electronic circuit, an amplifier network connected to the output terminals of said attenuator, means adapted to sample a portion of the output signal of said amplifier network, means to rectify and filter said sample signal and adapted to develop therefrom a negative potential which is a function of the output-signal level of said amplifier network, and means to apply said negative potential to the plates of said vacuum tubes in said electronic circuit.

6. A surgeless electronic variable attenuator comprising a voltage divider consisting of a fixed resistor and an electronic circuit, said electronic circuit comprising a pair of vacuum tubes each having at least three electrodes, the cathodes of the tubes being cross-connected to the other electrodes in the tubes in such a manner that the cathode of each tube is connected to the electrode nearest the cathode of the other tube, one of said cathodes being connected to the fixed resistor, and of the remaining electrodes at least the electrode nearest the electrode involved in the aforesaid cross-connection arrangement being connected to the corresponding electrode in the other tube, and means for impressing a variable regulating potential on said last named connected electrodes with respect to one of said cathodes, the input terminals of said attenuator comprising the free end of said fixed resistor and the free cross-connection and the output terminals comprising both of said cathodes.

7. Attenuator according to claim 6 in which said vacuum tubes are triode tubes and in which said means for impressing a variable regulating potential is connected to the plate of each tube.

8. Attenuator according to claim 6, in which said vacuum tubes are pentode tubes, the cathode of each tube being connected to the control grid of the other tube, the screen grid of each tube being connected to the screen grid of the other tube and the means for impressing the variable regulator potential being connected to the screen grids.

References Cited in the file of this patent

UNITED STATES PATENTS

| | | |
|---|---|---|
| 1,986,644 | Pfister | Jan. 1, 1935 |
| 2,049,306 | Matson | July 28, 1936 |
| 2,138,344 | Geyger | Nov. 29, 1938 |
| 2,215,805 | Wills | Sept. 24, 1940 |
| 2,247,468 | Barr et al. | July 1, 1941 |
| 2,276,708 | Wyckoff | Mar. 17, 1942 |
| 2,286,106 | Ritzmann | June 9, 1942 |
| 2,330,216 | Hoover | Sept. 28, 1943 |
| 2,528,885 | Hendricks | Nov. 7, 1950 |